United States Patent [19]

McAlister

[11] Patent Number: 5,538,707
[45] Date of Patent: Jul. 23, 1996

[54] ACID CONCENTRATION CONTROL IN $SO_3$ ABSORPTION

[75] Inventor: Donald R. McAlister, St. Louis, Mo.

[73] Assignee: Monsanto Company, St. Louis, Mo.

[21] Appl. No.: 203,821

[22] Filed: Mar. 1, 1994

[51] Int. Cl.$^6$ .................................................. C01B 17/69
[52] U.S. Cl. .................................... 423/522; 423/533
[58] Field of Search ................................ 423/522, 532, 423/533

[56] References Cited

U.S. PATENT DOCUMENTS

| | | | |
|---|---|---|---|
| 2,142,855 | 1/1939 | Laury | 423/522 |
| 4,368,183 | 1/1983 | Dörr et al. | 423/522 |
| 4,576,813 | 3/1986 | McAlister et al. | 423/522 |
| 4,670,242 | 6/1987 | McAlister et al. | 423/522 |
| 4,996,038 | 2/1991 | McAlister et al. | 423/522 |
| 5,118,490 | 6/1992 | McAlister | 423/522 |
| 5,130,112 | 7/1992 | McAlister et al. | 423/522 |

FOREIGN PATENT DOCUMENTS

| | | | |
|---|---|---|---|
| 60-186404 | 9/1985 | Japan | 423/533 |
| 471653 | 9/1937 | United Kingdom | 423/522 |
| 1267262 | 3/1972 | United Kingdom | 423/522 |

*Primary Examiner*—Gary P. Straub
*Attorney, Agent, or Firm*—Senniger, Powers, Leavitt & Roedel

[57] ABSTRACT

The concentration of sulfuric acid exiting a countercurrent $SO_3$ absorber is controlled by controlled addition of water vapor to the $SO_3$-containing process gas stream entering the absorber. The novel means of concentration control is useful for control of the acid concentration gradient in an $SO_3$ absorption process and apparatus for high temperature absorption, so as to achieve high temperature absorption heat recovery while minimizing corrosion and formation of acid mist.

29 Claims, 3 Drawing Sheets

ACID CONCENTRATION CONTROL IN SO₃ ABSORPTION

BACKGROUND OF THE INVENTION

This invention relates to control of emissions and corrosion in a contact sulfuric acid plant, and more particularly to controlling emissions and preventing corrosion by controlling acid concentrations in a high temperature sulfuric acid heat recovery absorption tower.

U.S. Pat. Nos. 4,576,813, 4,670,242 4,996,038, 5,118,490 and 5,130,112 describe the operation of a high temperature sulfuric acid absorbing tower where the heat of absorption is removed in useful form in an external acid heat exchanger, for example, a boiler producing medium pressure steam, typically at 3 to 15 bar. Steam in this pressure range can be transported and used either for process heat or to generate electricity by operation of a turbogenerator. For generation of steam at maximum feasible pressure, the high temperature absorption tower is preferably operated with countercurrent flow of acid and sulfur trioxide-containing process gas. Ordinarily, the heat recovery absorption tower serves as the interpass absorption tower for an otherwise conventional dual absorption acid plant.

U.S. Pat. Nos. 4,670,242 and 4,996,038 particularly describe an absorption tower having a condensing zone above the absorption zone for condensation of sulfuric acid vapor and absorption of residual sulfur trioxide in the gas exiting the absorption zone. Such a system is applicable to either the interpass absorption step of a dual absorption plant, or the absorption step of a single absorption plant.

It is common practice in contact acid plants to control the acid strength in an absorption tower by addition of water to the acid circulating between the tower exit and the tower inlet. In the absorption heat recovery systems described in U.S. Pat. Nos. 4,576,813 and 4,670,242, the concentration of acid exiting the absorption zone is maintained at ≧99% in order to protect the absorption acid heat exchanger from excessive corrosion at cold temperatures high enough for the generation of 3 to 15 bar steam. However, while increasing the acid concentration has a favorable effect on alloy corrosion rates, it may have an adverse effect on absorption efficiency, especially at high temperature. Since increasing temperature tends to have an adverse effect on both corrosion rates and absorption efficiency, the acid concentration at the exit of a high temperature absorption tower must be maintained within a narrow window, preferably slightly above 99% and below 100%, in order to allow recovery of absorption energy at high temperature without excessive slippage of SO₃ through the absorption zone. The maximum exit acid concentration which permits efficient absorption is determined by the concentration of sulfur trioxide in the gas entering the tower, the acid temperature, and the packed height of the absorption zone. For example, in the generation of steam at about 10 bar gauge, the exit acid temperature is typically in the range of 210° C. to 230° C., and with reasonable packed height the maximum permissible acid concentration is in the range of 99.7% to 99.3%, respectively. If the acid concentration is significantly higher, sulfur trioxide is not efficiently absorbed and reacts with water vapor in the cooler zones of the tower to produce undesirable acid mist. Given differences in target steam pressure, heat recovery absorption systems are most preferably operated with a target exit acid concentration in the range of 99.4% to 99.6%.

As described in the aforesaid patents, the absorber is preferably operated with countercurrent flow of acid and SO₃-containing process gas through the absorption zone. This allows the acid exiting the tower to have a concentration in the desired 99.2% to 99.8% range while maintaining a driving force for mass transfer even at temperatures high enough to generate 8 to 15 bar steam in the absorption acid cooler.

Although it is important to control the acid concentration at the exit of the heat recovery absorption zone in order to balance the conflicting objectives of acceptable absorption efficiency and minimum corrosion in the absorption acid cooler, the conventional method of control has been to add water to the acid recirculating from the tower exit so as to control the concentration to the tower inlet. In the processes of U.S. Pat. Nos. 4,576,183 and 4,670,242, this is preferably accomplished by addition of water to the acid circuit between the exit of the acid cooler and the inlet of the absorption zone. However, regardless of where in this circuit the water is added, the immediate effect is on the concentration of the acid at the inlet of the tower, not the exit, so that the conventional control mode has been to control acid concentration at the inlet only, allowing the exit acid strength to float as a function of inlet acid strength, SO₃ gas strength, process gas mass flow rate, mass transfer efficiency, and acid recirculation rate. The control point for inlet acid strength is adjusted as necessary to compensate for these variables and maintain the exit acid concentration within an acceptable range.

At conventional gas strength, process gas flow rate, and L/G in the absorption zone, the acid strength at the inlet of a countercurrent absorption tower is frequently controlled in the range of between about 98.3% to 98.6% in order to provide an exit acid concentration in the desired range. During operation in this range, rapid corrosion has been observed on wetted metal parts exposed to the gas stream exiting a high temperature absorption zone, for example, the acid distributor at the top of a countercurrent tower, and metal parts of a mist eliminator for removal of sulfuric acid mist from the gas. Operation at high absorption temperature in this concentration range has also been associated with excessive formation of acid mist in the absorption system. If the mist load exceeds the capacity of mist eliminators in the exit gas, acid depositing on metal surfaces of downstream equipment may cause further corrosion. Carbon steel is commonly used as the material of construction for equipment downstream of the mist eliminators such as, for example, the cold heat exchanger in which gas returning to the converter from an interpass absorption step is reheated for introduction into a downstream catalyst bed. Acid depositing on carbon steel surfaces will cause rapid corrosion.

SUMMARY OF THE INVENTION

Among the several objects of the present invention, therefore, may be noted the provision of an improved process for the manufacture of sulfuric acid; the provision of such a process in which SO₃ absorption may be conducted at high temperature; the provision of such a process in which absorption heat may be recovered at high temperature by transfer of heat from the absorption acid to a heat transfer fluid in the absorption acid cooler; the provision of such a process which may be operated with minimal corrosion of the absorption acid cooler; the provision of such a process which may operated at high absorption efficiency; the provision of such a process which may be operated with minimal corrosion of wetted parts in contact with gas exiting a countercurrent absorption zone; and the provision of such a process which may operated without the generation of excessive acid mist.

Briefly, therefore, the present invention is directed to an improvement in a process for the manufacture of sulfuric acid. The process comprises gas phase catalytic oxidation of sulfur dioxide to sulfur trioxide and absorption of the sulfur trioxide in sulfuric acid bypassing a process gas containing sulfuric acid through an absorption zone countercurrently to sulfuric acid. Sulfuric acid exiting the absorption zone is recirculated to the inlet of the absorption zone in an acid circulation circuit which comprises an absorption acid cooler. The absorption acid cooler comprises an indirect heat exchanger in which the heat of absorption is transferred to another fluid. Acid produced in the absorption zone is withdrawn from the acid circulation circuit. The improvement comprises controlling the concentration of the sulfuric acid exiting the absorption zone by introducing water vapor into the sulfur trioxide containing process gas stream entering the absorption zone.

The invention is further directed to an apparatus for high temperature absorption of sulfur trioxide from a process gas stream into a sulfuric acid absorption medium without excessive corrosion of metal components or generation of acid mist. The apparatus comprises an absorption tower, the absorption tower containing an absorption zone comprising means for promoting gas/liquid contact and mass transfer from the gas phase to the liquid phase, a gas inlet for the tower below the absorption zone, a gas exit for the tower above the absorption zone, an acid inlet for the tower above the absorption zone, and an acid exit for the absorption zone. The apparatus further comprises an absorption acid cooler comprising an indirect heat exchanger having an acid inlet and an acid exit, and acid circulation means. The acid circulation means comprises means for recirculating absorption acid exiting the tower to the acid inlet of the heat exchanger and from the acid exit of the heat exchanger to the absorption zone within the absorption tower. The apparatus further includes inlet acid dilution means for introducing dilution water into the recirculating absorption acid before it enters the absorption zone, exit acid dilution means for introducing water vapor into the process gas entering the absorption zone, measuring means for measuring the concentration of acid exiting the absorption zone prior to introduction of dilution water into the recirculating acid via said inlet acid dilution means, and control means responsive to the exit acid concentration measuring means for controlling the concentration of acid exiting the absorption zone by controlling the rate of introduction of water vapor into the process gas.

Other objects and features will be in part apparent and in part pointed out hereinafter.

BRIEF DESCRIPTION OF THE DRAWINGS

Corresponding reference characters indicate corresponding components in the several views of the drawings.

DESCRIPTION OF THE PREFERRED EMBODIMENTS

In accordance with the invention, novel methods have been devised for control of the acid concentrations entering and exiting a countercurrent $SO_3$ absorption tower, and controlling the acid concentration gradient in the tower, to meet objectives such as mist formation control, corrosion control, and recovery of absorption heat at high temperature. More particularly, it has been discovered that formation of excessive mist in the gas exiting a high temperature countercurrent $SO_3$ absorber can be prevented, and corrosion of wetted metal parts in contact with the exit gas stream can automatically controlling the concentration of the acid entering the absorption zone at or near the azeotrope, and by automatically controlling the acid concentration gradient across the tower. Acid inlet concentration is controlled by addition of water to the circulating acid stream in the acid circuit between the $SO_3$ absorber and the absorption acid cooler, while the concentration of acid exiting the tower is separately controlled by introducing water vapor into the $SO_3$-containing process gas stream entering the absorption zone.

The present invention is based on the discovery of several critical principles affecting the optimal operation of a high temperature countercurrent $SO_3$ absorber, particularly in the case where the heat of absorption is recovered in useful form at high temperature by transfer of heat from the absorption acid to another fluid, thereby heating the another fluid to a temperature in excess of 160° C. Operation under these conditions creates issues regarding corrosion of the absorption acid heat exchanger, mist generation in the gas exiting the absorption zone, and corrosion of wetted metal elements in contact with that gas stream.

Excessive corrosion and mist generation problems in high temperature countercurrent $SO_3$ absorbers can be controlled by controlling the acid strength at the gas exit of the tower at approximately the composition of the azeotrope, which is in the range of about 98.9 to about 99.1% by weight.

If the acid strength at the acid inlet/gas exit is significantly below the azeotrope composition, e.g., in the range of 98.5% to 98.6%, the water content of the vapor in equilibrium with the acid is higher than the water content of the liquid acid. As the gas leaving the absorption zone is cooled, the acid condensing from that gas becomes progressively more dilute, resulting in contact of acid distributors, mist eliminators, and other downstream equipment with acid significantly more dilute than 98.5%, and in turn causing accelerated corrosion of wetted metal parts.

Of course, the acid strength at the gas exit may be increased to any desired level by a temporary reduction of the rate of introduction of dilution water. However, in a plant operated under conventional acid circulation rates using conventional strategies for dilution of circulating acid, maintenance of the desired acid concentration at the inlet of the tower may conflict with maintaining the desired 99.3% to 99.7% acid strength at the acid exit of the tower, especially when operating at and high production rates. Consequently, if the inlet acid strength is allowed to rise to the optimal level, the acid strength at the acid exit may rise to a point where absorption efficiency is compromised.

Where the high temperature absorber serves as the interpass absorber for a dual absorption plant, a superficially attractive solution to the problems caused by low inlet acid strength is simply to increase the acid strength throughout the absorption zone, accept the increased slippage of $SO_3$ through the absorber, and recover this $SO_3$ downstream, either in a condensing stage between the absorption zone and the next catalyst bed or in the final absorption tower. However, at the concentration gradients that typically prevail in an $SO_3$ absorber, the exit acid concentration may rise to a point where absorption efficiency is significantly compromised even before the inlet acid concentration reaches the azeotropic range. The resultant $SO_3$ slippage, in combination with the high water content of the gas at the gas exit, has been found to cause very substantial generation of acid mist.

Figure 3:
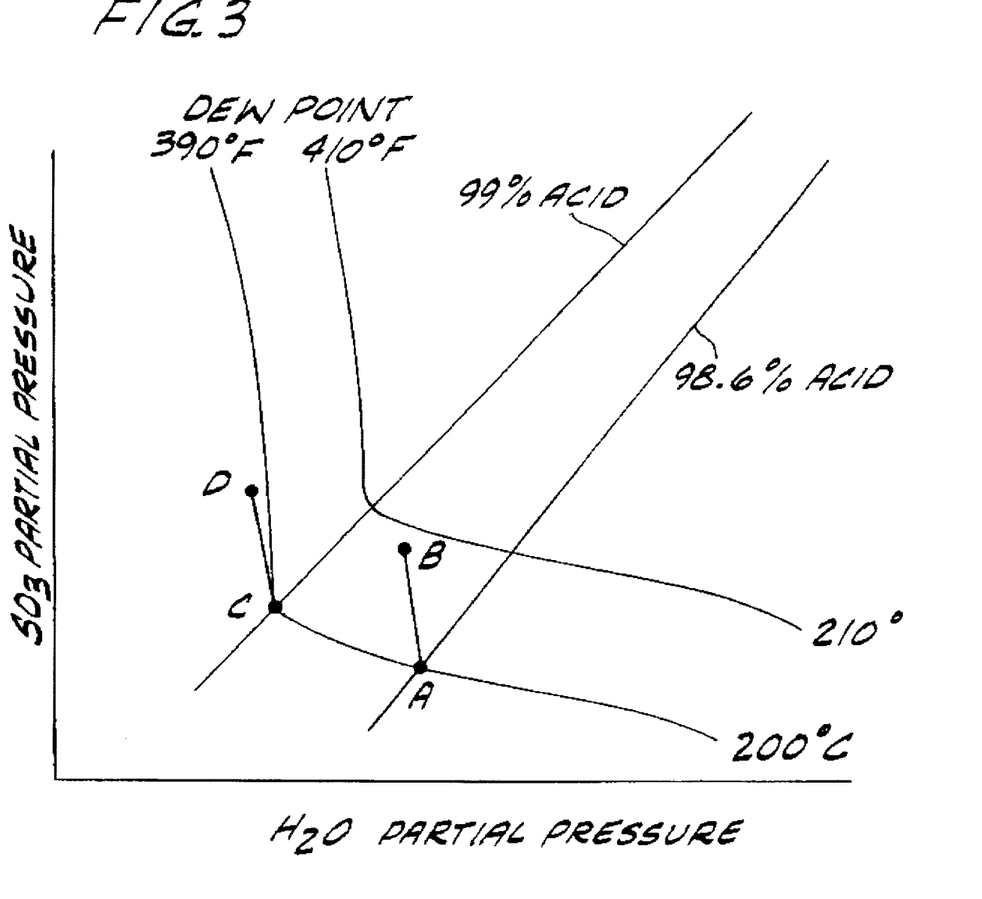
FIG. 3 is a diagram showing contours of constant dew point in a field of $SO_3$ concentration vs. $H_2O$ concentration for a gas having the general composition prevailing at gas exit of the absorption zone of a high temperature $SO_3$ absorber.

This phenomenon may be understood by reference to FIG. 3, an idealized schematic which contain dew point contours which illustrate how dewpoint varies as a function of the $SO_3$ and $H_2O$ content of the gas exiting the absorption zone. Also shown in this diagram are two lines representing the loci of vapor phase partial pressures in equilibrium with liquid sulfuric acid condensate having concentrations of 98.6% and 99.0% by weight. Point A on the diagram represents the water and sulfur trioxide content of a gas in equilibrium with 98.6% acid at 200° C. If this is mixed with a 200° C. sulfur trioxide bypass stream resulting from $SO_3$ slippage, the combined stream has an increased sulfur trioxide and a reduced water content, as represented, for example, by Point B. Since the temperature of the combined stream is approximately 200° C., and the dew point is well above 200° C., supersaturation occurs and acid mist is formed. But the consequence of modest $SO_3$ slippage is much different for an inlet acid strength of 99.0%, which is at or near the azeotrope. In this case Point C represents the water and sulfur trioxide content of the gas in equilibrium with the acid at 200° C. If this is mixed with a 200° C. sulfur trioxide bypass stream, the composition of the combined stream has an increased sulfur trioxide content and reduced water content, as represented by Point D. Since the temperature of the combined stream is approximately 200° C., and the dew point is below 200° C., no supersaturation, and thus no instant mist formation, occurs. It will be understood that FIG. 3 is not intended to show the precise dew point contours but is an idealized diagram which illustrates the significant effect of the of $SO_3$ slippage when combined with acid strength below the azeotrope at the gas exit of the absorption zone.

Depending on the liquid flow across the absorption zone, and the number of mass transfer units provided therein, it may not be feasible to increase the inlet acid concentration to the azeotrope concentration without massive $SO_3$ slippage. If bypass $SO_3$ can be maintained within an otherwise tolerable range only at inlet acid concentrations that remain even modestly below the azeotrope, condensation of dilute $H_2SO_4$ and deposit of dilute $H_2SO_4$ mist on acid distributors, mist eliminators, the walls of an Fe/Cr/Ni alloy tower, or downstream heat exchangers may result in corrosion problems in these process equipment items.

To a limited extent, these problems may be compensated for by use of a sulfuric acid irrigated condensing zone, as described, for example, in U.S. Pat. Nos. 4,996,038 and 5,118,490. However, once excessive amounts of acid mist are formed, they may not be efficiently removed in a sulfuric acid irrigated condensing stage. Moreover, the provision of a condensing stage affords no protection for wetted metal parts in contact with the gas stream exiting the absorption zone, such as acid distributors, or the shell of a metal absorption tower.

Figure 1:
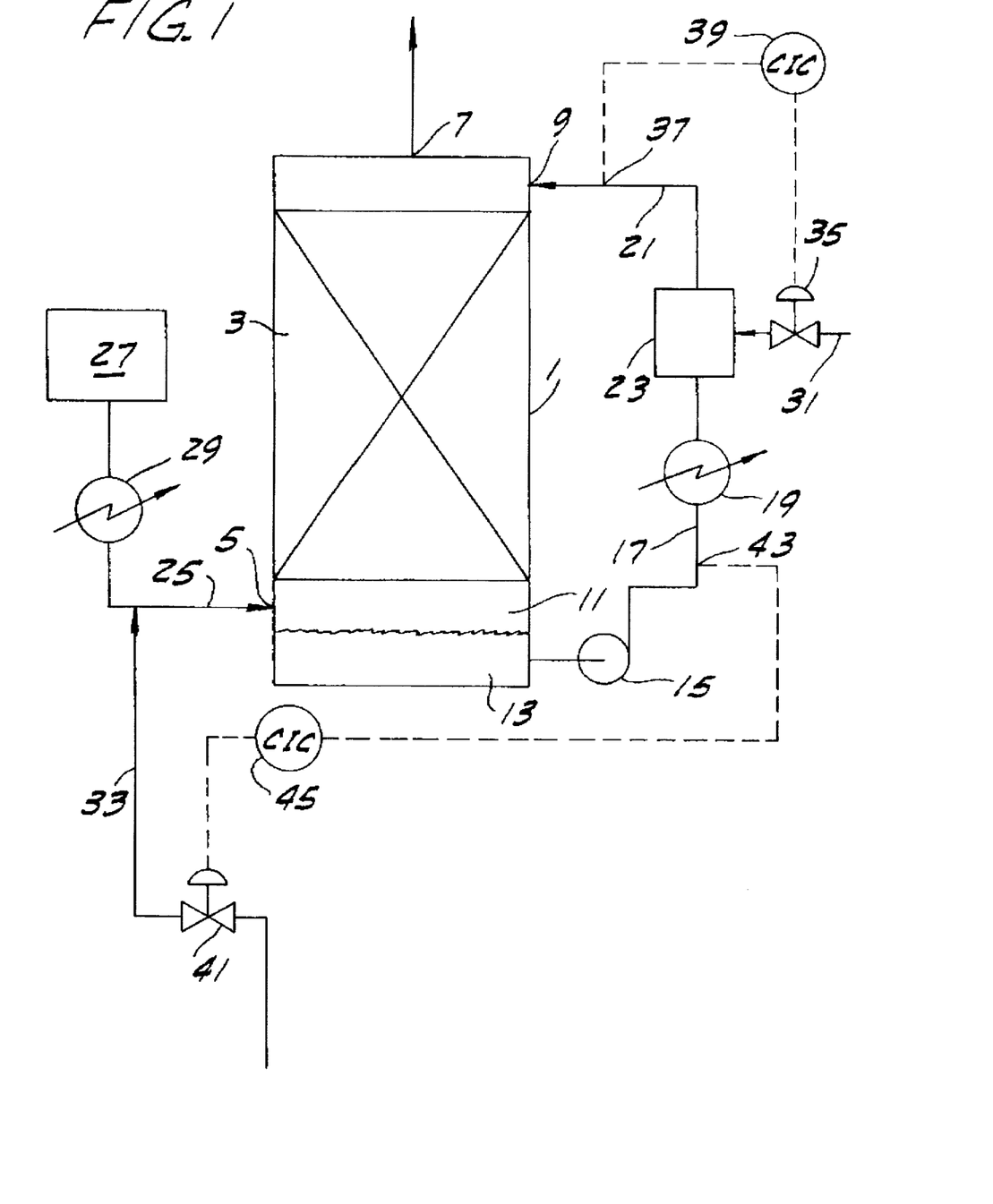
FIG. 1 is a schematic illustration of the flow sheet of a process operated in accordance with the invention, showing a control system for controlling acid strength at the inlet and exit of a heat recovery absorption tower.

FIG. 1 is a schematic flow diagram illustrating the apparatus and process of the invention. The apparatus comprises an absorption tower 1 containing an absorption zone 3 comprising means, such as random or structured packing, for promoting gas/liquid mass transfer. Tower 1 has a gas inlet 5, a gas exit 7, an absorption acid inlet 9 and an absorption zone acid exit or exit path 11. Acid exiting the absorption zone drains to a tower sump 13. An acid pump 15 circulates acid from the sump through acid circulation means comprising a hot acid circulation line 17, an absorption acid cooler 19, and a cooled acid circulation line 21 to inlet 9 of the tower. Absorption acid cooler 19 comprises an indirect heat exchanger, preferably a boiler for recovery of the heat of absorption in useful form as 6 to 12 bar (absolute) steam. The flow path comprising sump 13, pump 15, acid cooler 19 and lines 17 and 21 is commonly referred to as the acid circulation circuit for the absorber. A process gas feed line 25 connects inlet 5 of the tower to a source 27 of sulfur trioxide-containing process, typically a catalyst bed of a catalytic converter. In feed line 25 is process gas cooler 29, which comprises an indirect heat exchanger.

Dilution water for the absorption circuit is supplied from two sources. Liquid water or water vapor for dilution of inlet acid is mixed with cooled absorption acid in the acid recirculation circuit, preferably in a diluter 23 comprising a TFE lined vessel 23 in acid line 21. Dilution water is supplied to diluter 23 through a dilution line 31, and water vapor for dilution of exit acid is injected into process feed gas line 25 through a water vapor injection line 33.

The rate of addition of dilution water through line 31 is controlled by throttling a control valve 35 in line 31. Alternatively, a variable speed pump could be used for this purpose. Concentration of the acid entering the tower through line 31 is measured by a conductivity probe 37 located in line 21 downstream of the point of addition of dilution water through line 31 (i.e. diluter 23) and upstream of inlet 9 of the tower. A signal indicating the acid conductivity is transmitted to an acid concentration controller 39, in response to which the controller transmits a signal to the control valve 35 to control the rate of addition of water to the circulating acid to maintain the concentration of acid entering the absorption zone at a select value.

Similarly, the rate of addition of water vapor through line 33 for dilution of exit acid is controlled by throttling a control valve 41 in line 33, by operation of other flow varying means such as a variable speed pump. Concentration of the acid exiting the absorption zone is measured by a conductivity probe 43 located in line 17. A signal indicating the acid conductivity is transmitted to an acid concentration controller 45, which in turn transmits a signal to the control valve 41 to control the rate of addition of water vapor to the process gas stream to maintain the concentration of acid exiting the absorption zone at a select value.

In accordance with the process of the invention, process gas entering tower 1 through inlet 5 flows upwardly through absorption zone 3 countercurrently to downwardly flowing sulfuric acid. Enriched acid exiting the absorption zone is circulated by pump 15 from sump 13 through lines 17 and 21, acid cooler 19, and diluter 23 to tower inlet 9. The heat of absorption is preferably recovered in useful form by heating another fluid to at least about 160° C. in acid cooler 19. Advantageously, acid cooler 19 a boiler in which steam is generated at a pressure of at least about 6 bar (absolute). For generation of steam at 6 bar, the acid exiting the absorption zone is preferably at a temperature of at least about 180° C. More preferably, the exit acid temperature is at least about 200° C., most preferably about 210° C. to about 230° C., allowing generation of steam at a pressure of 8 to 12 bar.

The concentration of acid at the inlet of the absorption zone automatically is controlled regulating by addition of dilution water through line 31 as described above. In order to minimize mist generation at the gas exit of the absorption zone, and corrosion of wetted metal parts in contact with the exit gas stream, the acid concentration is controlled at or near the azeotrope. Under the conditions required for the generation of 8 to 12 bar steam, acid enters the absorption zone at a temperature typically in the range of about 180° C. to about 200° C. In this temperature range, the acid concentration at the acid inlet/gas exit is preferably controlled at between about 98.8% and about 99.2%, more preferably between about 98.9% and about 99.1%, all percentages being expressed on a weight basis.

As further described above, the concentration of acid at the exit of the absorption zone is automatically controlled by regulating addition of a water vapor to the process gas through line 33. While the rate of water addition through line 33 may be controlled manually, an automatic control circuit of the type illustrated in the drawing is highly preferred. In any case, water vapor injected through line 33 reacts with sulfur trioxide in the vapor phase, producing sulfuric acid which condenses in the liquid acid phase in absorption zone 3. Thus, the added water vapor serves to dilute the acid exiting the absorption zone. Since the bulk of this acid is recirculated to the tower inlet 9, the water vapor added through line 33 supplements the liquid water or water vapor added through line 31 to provide a supply of dilution water essentially stoichiometrically equivalent to the $SO_3$ entering in the process gas feed stream through feed line 25.

Measuring the strength of the acid exiting the absorption zone (via conductivity probe 43 in line 17) allows controller 45 to control the rate of addition of water vapor to control the acid strength exiting the absorption zone at a desired value. Where acid exits the absorption zone at a temperature of 200° C. or higher, the exit acid strength is preferably in the range of 99.3% to 99.7%, more preferably in the range of between about 99.4% and about 99.6%. Where the inlet concentration is near the azeotrope, and the exit concentration is in the preferred range, acceptable absorption efficiency is obtained while minimizing corrosion in the absorption acid cooler, the acid circulation circuit, and wetted metal parts in contact with the gas stream in or exiting the absorption zone.

The control scheme of the present invention offers significant advantages over other methods that may be available to the art for controlling the concentration gradient across the absorption zone. One alternative is to simply increase the rate of circulation of absorption acid over the tower and through the recirculation circuit. However, to achieve the desired concentrations at both the inlet and outlet of the tower, pumping rates would need to be increased very markedly above conventional levels, resulting in increased pumping costs, potentially increased gas pressure drop, and requiring increased capital requirements for the circulating pump, acid piping, heat exchanger, and the tower itself. Moreover, increasing the pumping rate reduces the average temperature driving force for heat transfer in the absorption acid cooler. Thus, for generation of steam at a given pressure, the cost of the heat exchanger would be need to be increased, not merely to accommodate higher acid flow rates, but to provide significantly increased heat transfer area to offset the reduced driving force for heat transfer.

Another alternative would be to provide 100% of the dilution water in a wet process gas, for example, using the process described in U.S. Pat. No. 5,118,490, or as an alternative in U.S. Pat. No. 5,130,112. However, if all the dilution water is provided by steam injection, the concentration gradient across the absorption zone is reduced to zero. If a high temperature absorption tower is operated in this manner, the acid concentration cannot be maintained much above the azeotrope, i.e., between 98.8% to 99.2%, more preferably 98.9% to 99.1%, or absorption efficiency will suffer. While a concentration near the azeotrope is optimal for the inlet acid, operation at modestly higher exit acid concentrations, in the aforesaid 99.3% to 99.7% range, affords significant improvements in the corrosion rates of Fe/Cr/Ni alloys used as materials of construction for the absorption acid cooler and other components of the acid circulation loop. Thus, provision of all dilution water by injection of steam into the process gas, and allowing the concentration gradient to drop to zero, tends to increase the rate of corrosion of an expensive heat exchanger. U.S. Pat. No. 5,130,112 discloses both dilution water addition to the acid circuit and steam injection into process gas to enhance high temperature energy recovery. The present invention provides a further advance in providing positive control of the exit acid strength by regulating the rate of steam introduction.

The process and apparatus of the invention are unique in providing positive control of the acid gradient so that the acid concentration at each end of the absorption zone is maintained at the optimum level for achievement of efficient high temperature heat transfer, efficient high temperature mass transfer, low corrosion rates of metal surfaces exposed to the exit acid and exit gas streams, and minimal acid mist formation. Moreover, the process is effective to achieve these results at gas strengths of 10 to 12% or more, by volume, at modest L/G ratios of between about 6.0 and about 8.0 on a weight to weight basis, thereby minimizing pumping energy requirements and gas pressure drop, while maximizing temperature driving force in the absorption acid heat exchanger. These various advantages allow significant capital cost savings in sizing of the heat exchanger, the acid pump and the absorption tower.

Although the optimal concentrations may vary somewhat with the nature of the materials of construction, and temperature at which absorption heat is recovered from the absorption acid, the preferred concentrations will usually be in the ranges outlined above. In any case, the optimal concentration gradient across the absorption zone is in the range of between about 0.3% and about 0.7% Considered from another perspective, between about 10% and about 60% of the dilution water is advantageously provided as water vapor in the process gas stream, and the remaining dilution water is added to the circulating acid stream.

Where the process gas stream is cooled to a relatively low temperature, for example in the range of between about 30° C. and about 100° C. below the temperature of the acid exiting the absorption zone, the gas is preferably reheated before it enters the absorption zone to at least about the temperature of the acid exiting the absorption zone. If the gas remains significantly cooler than the acid, significant quantities of mist can be formed by mixing hot acid vapors in the absorption zone with the relatively cold process gas. Injection of water vapor for control of exit acid concentration provides the concomitant advantageous effect of reheating the process gas stream by release of the energy of vapor phase reaction of $SO_3$ and $H_2O$ to $H_2SO_4$, thereby minimizing mist formation.

Water vapor is preferably introduced as low pressure steam having a pressure slightly higher than the pressure of the process gas stream into which it is injected. Generally, therefore, the injection steam should have a pressure of at least about 0.2 bar. Suitable steam sources include boiler blow down flash, deaerator vent steam, the low pressure port on a steam turbine for an electrical generator, etc. Available steam may vary in pressure between about 0.2 and about 10 bar gauge, but most preferably the steam used has a pressure in the range of about 0.3 to about 3 bar gauge. In an absorption heat recovery system of the type depicted in FIG. 1, the vapor phase heat of formation of sulfuric acid in the process gas stream is transferred to the acid phase by condensation of sulfuric acid vapor in the absorption zone, and both the heat of formation and the heat of condensation are ultimately recovered in the form of medium pressure steam in absorption acid heat exchanger 19. Energy contained in the steam is thereby upgraded where steam is generated in heat exchanger 19 at a pressure greater than the pressure at which steam is injected into the process gas through line 41. Preferably, energy is recovered by transfer to steam having a pressure at least 2.5 bar greater, more preferably at least about 6 bar greater than the pressure at which the steam is injected.

Figure 2:
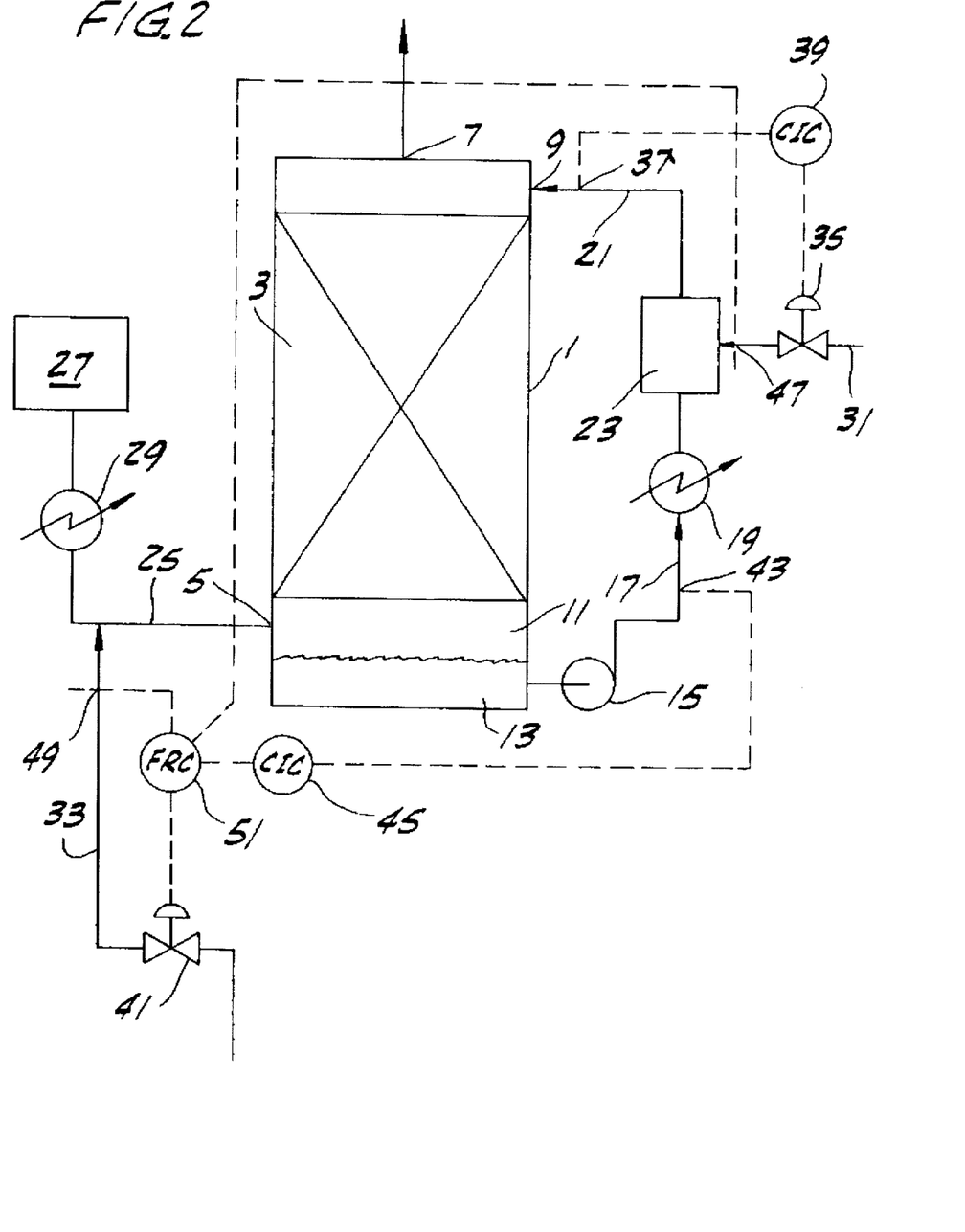
FIG. 2 is a schematic illustration of a flow sheet similar to that of FIG. 1, but showing an alternative control system for exit acid strength.

Illustrated in FIG. 2 is an alternative scheme for controlling the concentration of the acid at both the acid inlet and acid exit of the absorption zone. In FIG. 2, the concentration of acid entering the tower is controlled in the same manner as in the process and apparatus of FIG. 1. However, the rate of steam injection is controlled at a select ratio to the flow of water into diluter 23 through line 31. A flowmeter 47 measures the water flow rate through line 31 and a flowmeter 49 measures the rate of water vapor flow through line 33. Each of these flowmeters generates a signal which is transmitted to a flow ratio controller 51. Flow ratio controller 51 transmits a signal to valve 41 to throttle the flow of water vapor therethrough to maintain the ratio of flow through line 33 to the flow through line 31 at a select value. The set point of flow ratio controller 51 is in turn adjusted by a signal from acid concentration controller 45 to maintain the acid exiting the absorption zone at a select value.

The following example illustrates the invention.

EXAMPLE

In a 2270 metric tonnes/day sulfur-burning contact sulfuric acid plant, a sulfur trioxide process gas is produced by oxidation of sulfur dioxide in a converter feed gas initially containing 11.8% by volume $SO_2$. The process gas is cooled in an economizer to 187° C. by transfer of heat to boiler feed water. Gas exits the economizer at a rate of 60,000 $Nm^3/hr$. Steam is injected into this gas and it is thereafter introduced into a high temperature interpass absorption tower comprising a heat recovery tower, where it is passed countercurrently to sulfuric acid through random packing comprising the primary absorption zone of the tower. The tower includes a secondary absorption zone above the primary zone for cooling of exit gas and condensation of $H_2SO_4$, but is otherwise configured according to the schematic flow diagram set forth in FIG. 1.

Acid exiting the absorption zone 3 of tower 1 discharges through exit zone 11 into tower sump 13, whence it is recirculated to tower inlet 9 through line 17, absorption acid heat exchanger 19, diluter 23 and line 21. The concentration of the acid entering the absorption tower is maintained at 99.00% by controlling the addition of dilution water into diluter 23 via the control circuit comprising valve 35, controller 39 and conductivity probe 37 in line 21. The temperature of the acid as introduced through tower inlet 9 is 194° C. At the top of the absorption zone, this acid stream is mixed with about 100 $m^3/hr$ acid exiting the secondary absorption zone at a temperature of 180° C. and a concentration of about 98.8%, to produce a total acid flow of 1300 $m^3/hr$ at a temperature of 193° C. at the top of the primary zone packing. The minor flow component from the secondary absorption zone has no material effect on the concentration of the acid entering the primary absorption zone, which is effectively controlled within ±0.02% of 99.00% by maintaining the concentration of the acid at 99.00% at the primary acid inlet (9) of the tower.

Acid exits absorption zone at a temperature of 217° C. and is maintained at a concentration of 99.46% by injection of steam into the process gas entering the tower at a rate controlled via the control circuit comprising valve 41, controller 45 and conductivity probe 43 in line 15.

At steady state, steam is injected into the process gas feed line at a rate of 85 kg/min, raising the temperature of the process gas from 187° C. to 258° C. before it enters the absorption zone of the heat recovery tower. The L/G ratio is 7.8 on a weight to weight basis. In maintaining the strength of the acid in line 21 at 99.0%, water is added to diluter 23 at a rate of 174 kg/min. Heat exchanger 19 comprises a boiler in which the acid is cooled from 217° C. to 191° C. by generation of steam at 10.3 bar gauge. Steam at this pressure is generated at a rate of 49 metric tonnes per hour.

Mist content of the gas exiting the secondary absorption zone is only about 4 $g/m^3$. To maintain the same acid concentration exiting the absorption zone, and thus the same absorption efficiency in the primary absorption zone, a material balance shows that the acid concentration gradient would have been 0.70%, and the concentration of acid at the inlet of the absorption zone would have been 98.76%. At the latter concentration, mist content of the gas leaving the secondary absorption zone would have been significantly higher than 4 $g/m^3$.

What is claimed is:

1. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

introducing water vapor into said sulfur trioxide-containing process gas stream;

measuring the concentration of sulfuric acid exiting the absorption zone;

maintaining the concentration of the sulfuric acid exiting the absorption zone at a fixed value by regulating the rate of addition of water vapor into said sulfur trioxide-containing process gas stream in response to said measured exit concentration to control the exit acid concentration at said fixed exit value;

introducing water into the circulating acid stream;

measuring the concentration of sulfuric acid at a control point in the circulating acid circuit between the point of addition of water to the circulating acid and the acid inlet of the absorption zone; and maintaining the concentration of the sulfuric acid entering the absorption zone within a range of between 98.8% and about 99.2% by weight by regulating the rate of addition of water into the circulating acid stream in response to the measurement of acid concentration at said control point to control the inlet acid concentration at a fixed value within said inlet range.

2. In an improved process as set forth in claim 1 wherein the improvement further comprises controlling said exit acid concentration at a fixed value between about 99.2% by weight and about 99.8% by weight.

3. In an improved process as set forth in claim 1 wherein the improvement further comprises measuring the concentration of the sulfuric acid by electrical conductivity.

4. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

introducing water vapor into said sulfur trioxide-containing process gas stream;

measuring the concentration of sulfuric acid exiting the absorption zone;

maintaining the concentration of the sulfuric acid exiting the absorption zone at a fixed value by regulating the rate of addition of water vapor into said sulfur trioxide-containing process gas stream in response to said measured exit concentration to control the exit acid concentration at said fixed exit value;

introducing water into the circulating acid stream;

determining the difference between the concentration of the acid entering the absorption zone and the concentration of the acid exiting the absorption zone;

maintaining the difference between the concentration of the acid entering the absorption zone and the concentration of the acid exiting the absorption zone at a fixed value by regulating the rate of introduction of water into the circulating acid in response to the determination of said difference to control said difference at said fixed difference value, said select exit value and said select difference value being selected so that the concentration of acid entering said absorption zone is maintained within a range of between about 98.8% by weight and about 99.2% by weight.

5. A process as set forth in claim 4 wherein said fixed difference value is between about 0.3% and about 0.7%.

6. A process as set forth in claim 5 wherein said fixed exit value is between about 99.2% and about 99.8%.

7. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

introducing water into the circulating acid stream;

measuring the concentration of sulfuric acid at a control point in the circulating acid circuit between the point of addition of water to the circulating acid and the acid inlet of the absorption zone;

maintaining the concentration of the sulfuric acid entering the absorption zone within a range of between 98.8% and about 99.2% by weight by regulating the rate of addition of water into the circulating acid stream in response to the measurement of acid concentration at said control point to control the inlet acid concentration at a fixed value within said inlet range;

introducing water vapor into said sulfur trioxide-containing process gas stream;

determining the difference between the concentration of the acid entering the absorption zone and the concentration of the acid exiting the absorption zone; and maintaining the difference between the concentration of the acid entering the absorption zone and the concentration of the acid exiting the absorption at a fixed value by regulating the rate of addition of water vapor into the sulfur trioxide-containing process gas stream in response to the determination of said difference to control said difference at said fixed difference value.

8. A process as set forth in claim 7 wherein said fixed difference value is between about 0.3% and about 0.7% by weight.

9. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

introducing water vapor into said sulfur trioxide-containing process gas stream;

measuring the concentration of sulfuric acid exiting the absorption zone;

maintaining the concentration of the sulfuric acid exiting the absorption zone at a fixed value by regulating the rate of addition of water vapor into said sulfur trioxide-containing process gas stream in response to said measured exit concentration to control the exit acid concentration at said fixed exit value;

introducing water into the circulating acid stream;

determining the ratio of the rate of flow of water into said circulating acid stream to the rate of flow of water vapor into said process stream; and regulating the rate of addition of water to said circulating acid in response to the determination of said ratio to control said ratio at a fixed value, said fixed exit value and said fixed ratio being selected so that the concentration of acid entering said absorption zone is maintained within a range of between about 98.8% and about 99.2% by weight.

10. A process as set forth in claim 9 wherein said fixed exit value is between about 99.2% by weight and about 99.8% by weight.

11. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

introducing water into the circulating acid stream;

measuring the concentration of sulfuric acid at a control point in the circulating acid circuit between the point of addition of water to the circulating acid and the acid inlet of the absorption zone;

maintaining the concentration of the sulfuric acid entering the absorption zone within a range of between 98.8% and about 99.2% by weight by regulating the rate of addition of water into the circulating acid stream in response to the measurement of acid concentration at said control point to control the inlet acid concentration at a fixed value within said inlet range;

introducing water vapor into said process gas stream;

determining the ratio of the rate of flow of water vapor into said gas stream to rate of flow of water into said circulating stream; and regulating the rate of addition of water vapor to said process gas stream in response to the determination of said ratio to control said ratio at a fixed value.

12. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

(a) maintaining the concentration of sulfuric acid entering the absorption zone within an inlet acid concentration range of between about 98.8% and about 99.2% by weight by introducing water into the circulating acid stream and regulating the rate of introduction of water into the circulating acid to control the inlet acid concentration at a fixed inlet value within said inlet concentration range the amount of water added to the inlet acid being less than that needed to react with the $SO_3$ entering the absorber in said process gas stream;

(b) maintaining the concentration of the sulfuric acid exiting the absorption zone within an exit acid concentration range of between about 99.2% and about 99.8% by weight and above the azeotropic concentration by introducing water vapor into said sulfur trioxide-containing process gas stream and regulating the rate of introduction of water vapor to control the exit acid concentration at fixed exit value within said exit concentration range, the amount of water vapor introduced into said process gas stream being less than that needed to react with the $SO_3$, the sum of the amounts of water and water vapor added in steps (a) and (b) being the amount needed to produce acid at said exit value;

(c) the value at which the exit acid concentration is controlled being at least about 0.3% by weight greater than the value at which the inlet acid concentration is controlled.

13. In an improved process as set forth in claim 12 wherein the improvement further comprises controlling the concentration of the acid exiting said absorption zone at a fixed value between about 99.3% by weight and about 99.7% by weight.

14. In an improved process as set forth in claim 13 wherein the improvement further comprises controlling the concentration of the acid exiting said absorption zone at a fixed value between about 99.4% by weight and about 99.6% by weight.

15. In an improved process as set forth in claim 12 wherein the improvement further comprises the temperature of the acid exiting the absorption zone being at least about 200° C.

16. In an improved process as set forth in claim 15 wherein the improvement further comprises removing the heat of absorption in useful form from the acid exiting said absorption zone through transfer of heat to another fluid in said heat exchanger and thereby heating said another fluid to a temperature greater than 160° C.

17. In an improved process as set forth in claim 16 wherein the improvement further comprises recovering the heat energy from the vapor phase heat of formation of sulfuric acid in said process gas, said vapor phase heat of formation being recovered in an indirect heat exchanger by transfer to steam having a pressure of at least about 2.5 bar higher than the pressure of said water vapor as introduced into said process gas stream or to feed water from which said steam is generated.

18. In an improved process as set forth in claim 12 wherein the improvement further comprises controlling the acid entering the absorption zone at a fixed value between about 98.9% and about 99.1% by weight.

19. In an improved process as set forth in claim 12 wherein the improvement further comprises introducing water vapor into said process gas stream in the form of low pressure steam.

20. In an improved process as set forth in claim 19 wherein the improvement further comprises passing said process gas stream through a process gas cooler prior to introduction of said process gas stream into said absorption zone, said process gas cooler comprising an indirect heat exchanger for transfer of heat from said gas stream to a heat transfer fluid, said low pressure steam being introduced into said process gas stream after the process gas stream exits said process gas cooler but before the gas enters said absorber, said process gas stream being cooled in said gas cooler to a temperature between about 30° C. and about 100° C. below the temperature of the acid exiting said absorption zone, and the process gas exiting said cooler being reheated by introduction of said low pressure steam to a temperature not lower than the temperature of the acid exiting said absorption zone.

21. In a process as set forth in claim 12 wherein the improvement further comprises controlling said inlet acid concentration at a fixed value between about 0.3% and about 0.7% by weight greater than the fixed value at which said exit acid concentration is controlled.

22. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

(a) maintaining the concentration of acid exiting the absorption zone within an exit acid concentration range of between about 99.2% and about 99.8% by weight and above the azeotropic concentration by introducing water vapor into said sulfur trioxide-containing process gas stream and regulating the rate of introduction of water vapor to control the exit concentration at a fixed exit value within said exit concentration range, the amount of water vapor introduced into said process gas stream being less than that needed to react with the $SO_3$ contained in said gas stream;

(b) maintaining the difference between the concentration of the acid entering the absorption zone and the concentration of the acid exiting the absorption zone at a fixed value of at least about 0.3% by weight by introducing water into the circulating acid stream and regulating the rate of introduction of water into the circulating acid to control said difference at said fixed difference value, said fixed exit value and said fixed difference value being selected so that the concentration of acid entering said absorption zone is maintained within a range of between about 98.8% by weight and about 99.2% by weight, the amount of water introduced into the circulating acid stream being less than that needed to react with the $SO_3$, the sum of the amounts of water and water vapor added in steps (a) and (b) being the amount needed to produce acid having said fixed exit concentration.

23. In a process as set forth in claim 22 wherein the improvement further comprises said fixed difference value being between about 0.3% and about 0.7% by weight.

24. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

(a) maintaining the concentration of sulfuric acid entering the absorption zone within an inlet acid concentration range of between about 98.8% and about 99.2% by weight by introducing water into the circulating acid stream and regulating the rate of introduction of water into the circulating acid to control the inlet acid concentration at a fixed inlet value within said inlet concentration range, the amount of water added to the inlet acid being less than that needed to react with the $SO_3$ entering the absorber in said process gas stream; and (b) maintaining the difference between the concentration of the acid entering the absorption zone and the concentration of the acid exiting the absorption at a fixed value of at least about 0.3% by weight by introducing water vapor into the sulfur trioxide-containing process gas stream and regulating the rate of introduction of water vapor to control said difference at said fixed difference value, the amount of water vapor introduced into said process gas stream being less than that needed to react with the $SO_3$, the sum of the amounts of water and water vapor added in steps (a) and (b) being the amount needed to produce acid having a concentration above the azeotrope and at least about 0.3% greater than the concentration of the acid entering the absorption zone.

25. In a process as set forth in claim 24 wherein the improvement further comprises said fixed difference value being between about 0.3% and about 0.7% by weight.

26. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

(a) maintaining the concentration of acid exiting the absorption zone within an exit acid concentration range of between about 99.2 and about 99.8% by weight and above the azeotropic concentration by introducing water vapor into said sulfur trioxide-containing process gas stream and regulating the rate of introduction of water vapor to control the exit concentration at a fixed exit value within said exit concentration range, the amount of water vapor introduced into said process gas stream being less than that needed to react with the $SO_3$ contained in said gas stream;

(b) introducing water into said circulating acid at a fixed ratio to the rate of addition of water vapor into said process gas stream, said fixed exit value and said fixed ratio being selected so that the concentration of acid entering said absorption zone is maintained within a range of between about 98.8% and about 99.2% by weight, the amount of water introduced into the circulating acid stream being less than that needed to react with the $SO_3$, the sum of the amounts of water and water vapor added in steps (a) and (b) being the amount needed to produce acid having said fixed exit concentration;

(c) said fixed ratio being selected so that the difference between the inlet acid concentration and the exit acid concentration is maintained at at least about 0.3% by weight.

27. In a process as set forth in claim 26 wherein the improvement further comprises said fixed ratio being selected so that the difference between the inlet acid concentration and the exit acid concentration is maintained at between about 0.3% and about 0.7% by weight.

28. In a process for the manufacture of sulfuric acid comprising gas phase catalytic oxidation of sulfur dioxide to sulfur trioxide and absorption of the sulfur trioxide in sulfuric acid by passing a process gas containing sulfur trioxide through an absorption zone countercurrently to sulfuric acid, sulfuric acid exiting the absorption zone being recirculated to the inlet of said absorption zone in an acid circulation circuit which comprises an absorption acid cooler, said absorption acid cooler comprising an indirect heat exchanger in which the heat of absorption is transferred to another fluid, acid produced in the absorption zone being withdrawn from said acid circulation circuit, the improvement which comprises:

(a) maintaining the concentration of sulfuric acid entering the absorption zone within an inlet acid concentration range of between about 98.8% and about 99.2% by weight by introducing water into the circulating acid stream and regulating the rate of introduction of water into the circulating acid to control the inlet acid concentration at a fixed inlet value within said inlet concentration range, the amount of water added to the inlet acid being less than that needed to react with the $SO_3$ entering the absorber in said process gas stream; and (b) introducing water vapor into said process gas stream at a fixed ratio to the rate of addition of water to said circulating acid, the amount of water vapor introduced into said process gas stream being less than that needed to react with the $SO_3$, the sum of the amounts of water and water vapor added in steps (a) and (b) being the amount needed to produce acid having a concentration above the azeotrope and at least about 0.3% greater than the concentration of the acid entering the absorption zone;

(c) said fixed ratio being selected so that the difference between the inlet acid concentration and the exit acid concentration is maintained at at least about 0.3% by weight.

29. In a process as set forth in claim 28 wherein the improvement further comprises said fixed ratio being selected so that the difference between the inlet acid concentration and the exit acid concentration is maintained at between about 0.3% and about 0.7% by weight.

* * * * *

UNITED STATES PATENT AND TRADEMARK OFFICE
CERTIFICATE OF CORRECTION

PATENT NO. : 5,538,707
DATED : July 23, 1996
INVENTOR(S) : Donald R. McAlister

It is certified that error appears in the above-indentified patent and that said Letters Patent is hereby corrected as shown below:

Column 4, lines 12-13, "can automatically controlling" should read ---can be minimized, by automatically controlling---.

Column 4, line 28, "heating the another" should read ---heating another---.

Column 6, line 67, "controlled regulating by" should read ---controlled by regulating---.

Signed and Sealed this

Twenty-second Day of July, 1997

Attest:

BRUCE LEHMAN

*Attesting Officer*    *Commissioner of Patents and Trademarks*